(12) United States Patent
Prater

(10) Patent No.: US 7,209,528 B2
(45) Date of Patent: Apr. 24, 2007

(54) OVER-SAMPLING A/D CONVERTER WITH ADJACENT CHANNEL POWER DETECTION

(75) Inventor: James S. Prater, Fort Collins, CO (US)

(73) Assignee: National Semiconductor, Inc., Santa Clara, CA (US)

( * ) Notice: Subject to any disclaimer, the term of this patent is extended or adjusted under 35 U.S.C. 154(b) by 1206 days.

(21) Appl. No.: 09/872,271

(22) Filed: Jun. 1, 2001

(65) Prior Publication Data

US 2002/0181568 A1    Dec. 5, 2002

(51) Int. Cl.
H04L 27/08    (2006.01)
H03M 1/12    (2006.01)
H04B 17/00    (2006.01)

(52) U.S. Cl. .................... 375/345; 341/155; 455/226.1
(58) Field of Classification Search ................ 375/222, 375/219, 316, 345, 155, 341, 340, 344; 341/155, 341/157–158; 455/131, 136, 138, 140, 151.2, 455/226.1–226.2, 234.1–234.2, 232.1; 327/553
See application file for complete search history.

(56) References Cited

U.S. PATENT DOCUMENTS

| | | | | |
|---|---|---|---|---|
| 3,699,444 A | * | 10/1972 | Ghose et al. ................. | 455/79 |
| 4,192,970 A | * | 3/1980 | Kahn .......................... | 381/15 |
| 5,396,189 A | * | 3/1995 | Hays .......................... | 330/149 |
| 5,668,552 A | * | 9/1997 | Thurston ..................... | 341/143 |
| 5,872,540 A | * | 2/1999 | Casabona et al. ........... | 342/362 |
| 5,930,231 A | * | 7/1999 | Miller et al. ................ | 370/210 |
| 6,066,980 A | * | 5/2000 | Daribi ........................ | 327/552 |
| 6,111,911 A | * | 8/2000 | Sanderford et al. ......... | 375/147 |
| 6,177,906 B1 | * | 1/2001 | Petrus ......................... | 342/378 |
| 6,225,928 B1 | * | 5/2001 | Green ......................... | 341/143 |
| 6,272,226 B1 | * | 8/2001 | Khan et al. .................... | 381/4 |
| 6,369,644 B1 | * | 4/2002 | Yoshizawa .................. | 327/553 |
| 6,393,070 B1 | * | 5/2002 | Reber .......................... | 375/340 |
| 6,466,629 B1 | * | 10/2002 | Isaksson et al. ............ | 375/316 |
| 6,771,707 B1 | * | 8/2004 | Limberg ..................... | 375/270 |
| 6,775,345 B1 | * | 8/2004 | Song ........................... | 375/376 |
| 6,813,319 B1 | * | 11/2004 | Nagle et al. ................ | 375/302 |
| 6,873,205 B1 | * | 3/2005 | Tsividis et al. ............. | 327/552 |
| 6,937,176 B2 | * | 8/2005 | Freeman et al. ............ | 341/143 |
| 2001/0021939 A1 | * | 9/2001 | Schollhorn .................. | 708/300 |
| 2003/0021367 A1 | * | 1/2003 | Smith .......................... | 375/346 |
| 2003/0112063 A1 | * | 6/2003 | Kenington ................... | 330/10 |

OTHER PUBLICATIONS

"Delta Sigma Data Converters", S. Norsworthy, R. Schreier, G. Temes, *IEEE Press.*, 1997.

* cited by examiner

Primary Examiner—Emmanuel Bayard
Assistant Examiner—Lawrence B. Williams
(74) Attorney, Agent, or Firm—William W. Cochran; Cochran Freund & Young LLC

(57) ABSTRACT

Disclosed is a sampling circuit for a receiver in a wireless communication device that eliminates the need for separate discrete filtering components that can be expensive and bulky. The system utilizes techniques for ensuring that system components do not become saturated by blocker signals as a result of the removal of the discrete filter. Further, active filters are used in place of the discrete filter only when a blocker signal is present to minimize power consumption. In addition, the dynamic range of a sampling circuit can be altered in the presence of a blocker signal to ensure that the baseband signal is adequately detected.

17 Claims, 9 Drawing Sheets

OVER-SAMPLING A/D CONVERTER WITH ADJACENT CHANNEL POWER DETECTION

BACKGROUND OF THE INVENTION a. Field of the Invention

The present invention generally pertains to wireless communication technology and more specifically to A/D sampling of baseband signals with blocker signals present from adjacent channels.

b. Description of the Background

In wireless communications, such as wireless cell phone communications, different frequency channels are assigned for wirelessly communicating between base stations and transceivers such as cell stations and cell phones. Very often, signals from other cell phones on adjacent channels or other signals (i.e., collectively referred to as blocker or jammer signals) are detected by the transceivers. To avoid this problem, expensive surface acoustic wave (SAW) filters are typically inserted between the IF stage and the baseband stage of the cell phone receiver. SAW filters work very effectively as band-pass filters by only passing the particular frequency channel desired. However, SAW filters are expensive, are implemented as separate discrete components, and as such, occupy valuable room on the printed circuit board of the cell phone. Additionally, separate pin-outs have to be employed for the SAW filters to provide the filtering function between the IF stage and the baseband stage of the receiver. Hence, discrete components such as SAW filters do not provide for a high degree of integration which is an important feature in wireless transceivers. Replacement of the SAW filter with other types of filters, such as active filters, may not provide the channelization that the SAW filter provides and results in larger power consumption. The amount of power consumption in battery-operated transceivers is a critical factor in the design of these devices. Active filters that are constantly-on require power which must be conserved in battery-operated communication devices such as cell phones.

Hence, a technique is needed for providing a sampling circuit that can operate effectively in the presence of blocker or jammer signals in battery-operated mobile communication devices that conserves power and can be integrated into a sampling circuit chip, thereby eliminating the need for off-chip discrete components.

SUMMARY OF THE INVENTION

The present invention overcomes the disadvantages and limitations of the prior art by providing a sampling circuit that is capable of operating effectively in the presence of a blocker signal by preventing saturation of sampling circuit components when a SAW filter is removed. Further, other embodiments to the present invention provide for the use of an on-chip active filter that is only used when a blocker signal is present so as to reduce power consumption of the active filter. Further, the present invention provides for an increase in the dynamic range of a sampling circuit based upon the detection of a blocker signal to insure that the baseband signal is detected. The dynamic range of the sampling circuit can be increased by increasing the clock rate of the sampling circuit when a blocker signal is detected or by increasing the order of the operation of the sampling circuit when a blocker signal is detected. Each of these techniques increases the dynamic range only when the blocker signal is detected so as to reduce power consumption.

The present invention may therefore comprise a method of preventing saturation of an analog to digital converter circuit by an input signal that contains both a baseband signal component and a blocker signal component comprising: oversampling the input signal; separating the blocker signal component from the input signal; detecting the amplitude of the blocker signal component; separating the baseband signal component from the input signal; adjusting the amplitude of the baseband signal component based upon the amplitude of the blocker signal component prior to application of the baseband signal component to a modem that controls the gain of the wireless receiver circuit so that the gain maintains the input signal in a range that prevents saturation of the wireless receiver circuit.

The present invention may further comprise a method of actively filtering an input signal of an analog to digital converter circuit that may contain both a baseband signal component and a blocker signal component comprising: detecting the presence of the blocker signal component in the input signal; generating a control signal upon detection of the blocker signal component; applying an active filter to the input signal in response to the control signal so that the power consumption of the receiver circuit is minimized, the active filter being integrated into the receiver circuit.

The present invention may further comprise a method of adjusting the dynamic range of a sampling circuit in a wireless receiver circuit to increase detection of a baseband signal component in an input signal that contains a baseband signal component and a blocker signal component comprising: separating the blocker signal component from the input signal; detecting the presence of the blocker signal component in the input signal; adjusting the sampling rate of the sampling circuit based upon the presence of the blocker signal component in the input signal such that the dynamic range of the sampling circuit increases whenever the blocker signal component is present.

The advantages of the present invention are that expensive discrete components such as SAW filters can be eliminated from the receiver circuit of a mobile communication device. Rather than rely upon such expensive discrete components that occupy valuable space on circuit boards of mobile communications devices, the present invention may employ several techniques for accurately detecting and sampling baseband signals. For example, if a blocker signal is not a strong signal, one embodiment of the present invention adjusts the gain of the baseband signal to insure that the variable gain amplifier provides the proper gain to the sampling circuit. As long as blocker signals do not constitute a significantly large portion of the detected signal, this embodiment provides a simple and inexpensive solution.

Another embodiment of the present invention provides an attenuator circuit that prevents saturation of the sampling circuit whenever a blocker signal is present. The attenuator circuit can also be incorporated on-chip, which provides an inexpensive method for allowing the removal of the SAW filter.

In applications where blocker signals may constitute a large portion of the received signal, other techniques can be used. For example, in one embodiment of the invention, an active filter can be employed when a blocker signal is detected to insure that substantially most of the sampled signal constitutes the baseband signal desired, rather than the blocker signal. Since the active low-pass filter is only activated when a blocker signal is present, power consumption can be reduced. Further, the active low-pass filter can be incorporated on the chip so as to eliminate the need for expensive discrete components.

Another advantage of the present invention is that the dynamic range of the sampler can be varied upon detection of a blocker signal so that the full range of the baseband signal can be detected in an input signal that contains both the blocker signal and the baseband signal. The dynamic range of the sampling circuit can be adjusted by changing the clock rate of the sampler or changing the order of operation of the sampler circuitry. These techniques can be performed on-chip without the need for any off-chip discrete components. Hence, an effective method of detecting the full range of the baseband signal can be provided using changes in the on-chip circuitry. Again, expensive discrete components can be eliminated while providing high quality signal detection.

PREFERRED EMBODIMENT OF THE INVENTION

Figure 1A:
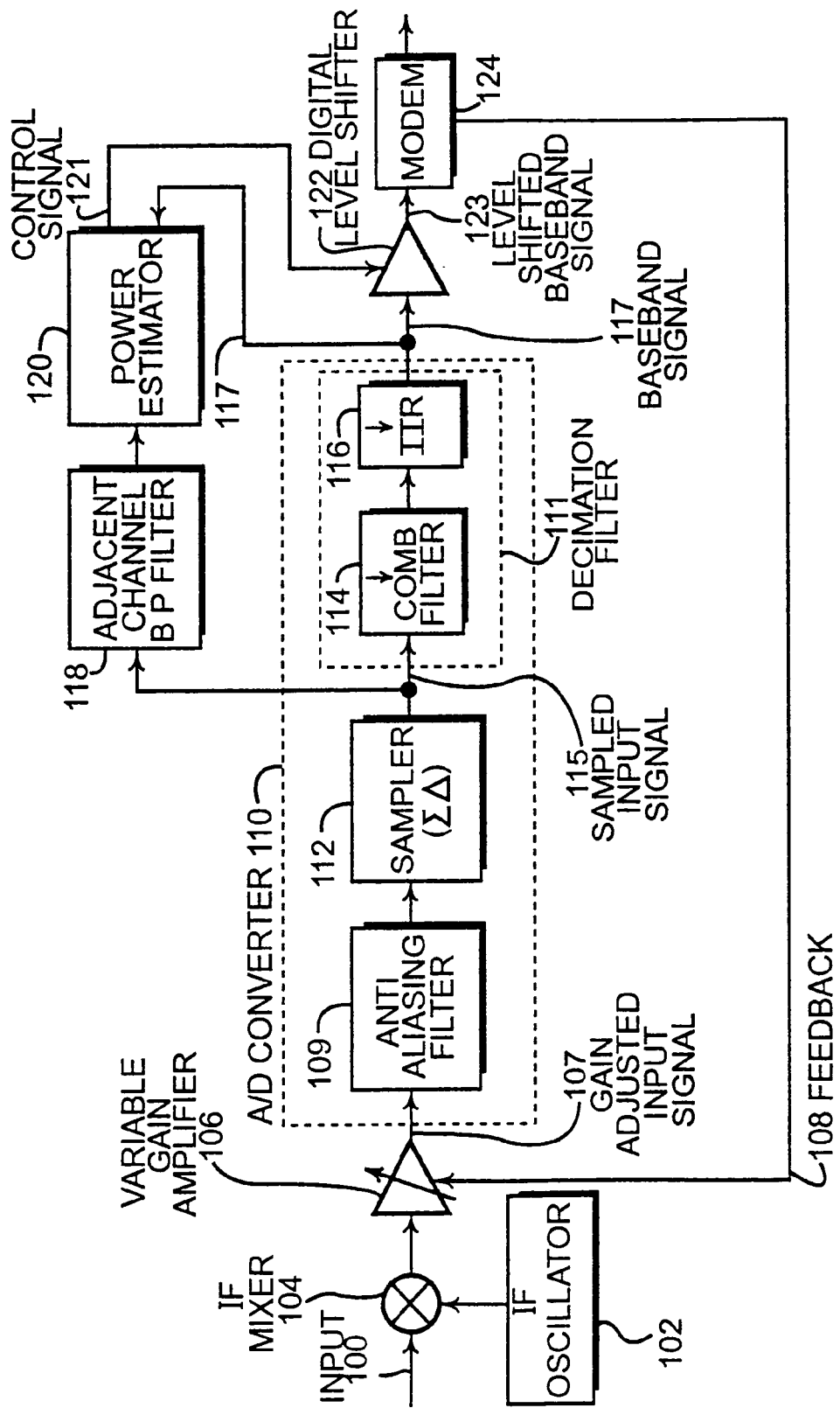
FIG. 1A is a schematic block diagram of one embodiment of the invention that prevents saturation of the variable gain amplifier and sampler circuit when the SAW filter is removed.

FIG. 1A is schematic block diagram of one embodiment of the invention. As shown in FIG. 1A, a detected input signal 100 may constitute the received signal of a communications device such as a wireless telephone. The input signal 100 is a signal that is received on a specific frequency channel but may also include portions of signals from adjacent frequency channels that may comprise other cell phone signals or signals from other sources, i.e., blocker signals. Typically, discrete components such as SAW filters are used to precisely filter the desired signal in the IF frequency channel. However, as pointed out above, these devices are expensive and occupy valuable room on the circuit board of the communications device. As a result of the removal of the SAW filter, the input signal 100 may include portions of adjacent channel signals.

As also shown in FIG. 1A, the input signal 100 is applied to the IF mixer 104. An IF oscillator 102 is tuned to select a channel that includes the combined baseband and blocker input signal 103 that is applied to the variable gain amplifier 106. The variable gain amplifier 106 operates under the control of a feedback signal 108 from the modem 124. The variable gain amplifier 106 generates a gain-adjusted input signal 107 that has an amplitude that is maintained within a predetermined amplitude range prior to being applied to the A/D converter 110. Antialiasing filter 109 removes harmonics and other noise from the gain adjusted input signal 107. Sampler 112 may comprise an over-sampling circuit that samples at a rate that is greater than the rate of the output of the analog to digital converter 110. The sampler may comprise a sigma-delta (delta-sigma) modulator as is commonly used in these types of A/D circuits. However, a conventional A/D converter running at an over-sampled rate can be used, as well, that employs techniques that increase the dynamic range of the A/D converter. The output of the sampler 112 (sampled input signal 115) is applied to a decimation filter 111 that includes a comb filter 114 and infinite impulse response (IIR) filter 116. Alternatively, a finite impulse response (FIR) filter can be used in place of IIR filter 116. The decimation filter 111 functions to low pass filter and reduce the data rate and therefore limit the spectrum of the sampled input signal 115 so that the output signal 117 of the decimation filter 111 comprises only the baseband signal. The sampling rate of the sampler 112 is sufficiently high that the Nyquist frequency encompasses signals and quantization noise from adjacent channels. As explained above, the decimation filter 111 limits the output sampling rate such that the Nyquist frequency only encompasses the baseband signal.

As also shown in FIG. 1A, sampled input signal 115 is applied to an adjacent channel band-pass filter 118. This filter may comprise one or more filters for selecting blocker signals that may exist on one or more adjacent frequency channels. The adjacent channel band-pass filter 118 may be tuned to one or more adjacent frequency channels on which a blocker signal is most likely to be present. The output of the adjacent channel band-pass filter 118 is applied to a power estimator 120 that generates a power level control signal 121 that is based upon the power level of the blocker signal that is detected by the power estimator 120. The signal level control signal 121 is applied to a digital level shifter 122 to adjust the amplitude of the level shifted signal 123. Modem 124 transforms the digital signal 123 into a demodulated binary signal. In addition, modem 124 detects the signal level of the level shifted baseband signal 123 and generates a feedback control signal 108 that is applied to the gain control input of the variable gain amplifier 106. Modem 124 maintains level shifted baseband signal 123 within a predetermined amplitude range so that the level shifted baseband signal 123 can be adequately detected by modem 124. Control signal 121 controls the digital level shifter 122 so that the amplitude of the level shifted baseband signal 123 is sufficiently high that modem 124 does not cause the variable gain amplifier to increase the gain of the gain adjusted input signal 107 to the point that the analog to digital converter 10 is saturated.

In operation, the digital level shifter 122, illustrated in FIG. 1A, adjusts the digital baseband signal 117 by an amount based upon the power level or amplitude of the blocker signal component that forms a part of the gain-adjusted input signal 107. Without the digital level shifter 122, the baseband signal 117 would be applied directly to the modem 124. The baseband signal 117 may constitute only a portion of the overall gain-adjusted signal 107 that is applied to the analog to digital converter 110. If that were the case, the modem 124 would generate a feedback signal 108 to increase the gain of the variable gain amplifier 106 to a signal level that may saturate the sampler 112. By adjusting the level of the baseband signal 117 by an amount based upon the amplitude of the blocker signal component, the feedback control signal 108 from modem 124 can be controlled to provide the correct variable gain control signal to the variable gain amplifier 106 and ensure that the analog to digital converter 110 is not saturated.

FIG. 1A also illustrates that the baseband signal 117 is applied to the power estimator 120. The power estimator 120 can therefore detect the level of the baseband signal. If the baseband signal is large enough, then a control signal 121 does not have to be generated to increase the level of the baseband signal 117. In other words, as long as the baseband signal 117 is above a predetermined threshold, the digital level shifter 122 does not have to be employed to shift the level of the baseband signal 117 to ensure that the modem 124 detects the baseband signal 117.

Figure 7:
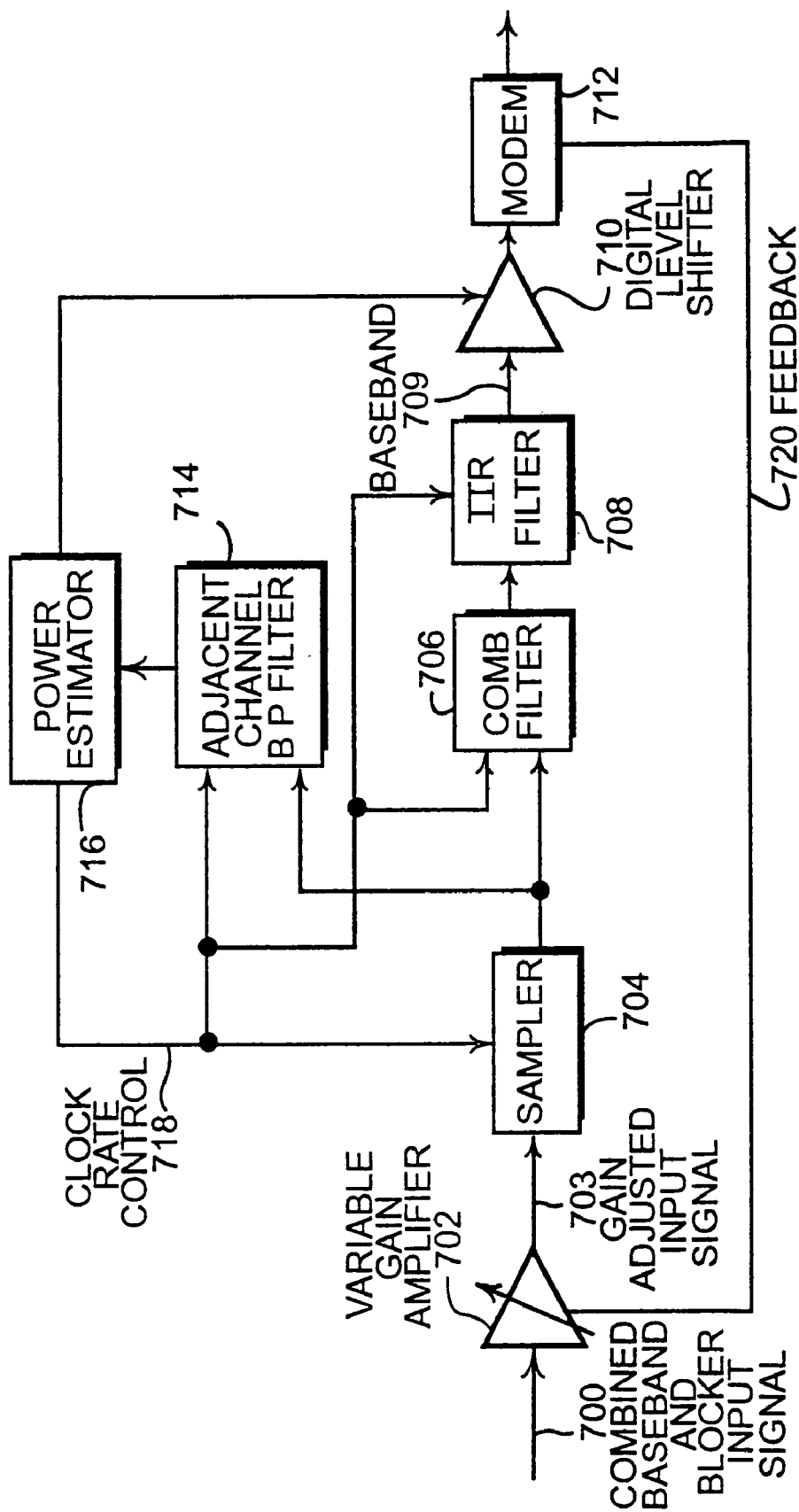
FIG. 7 is a schematic block diagram of another embodiment of the invention that employs a sampler having a dynamic range that varies by changing the clock rate of the sampler based upon the amplitude of the detected blocker signal.
Figure 8:
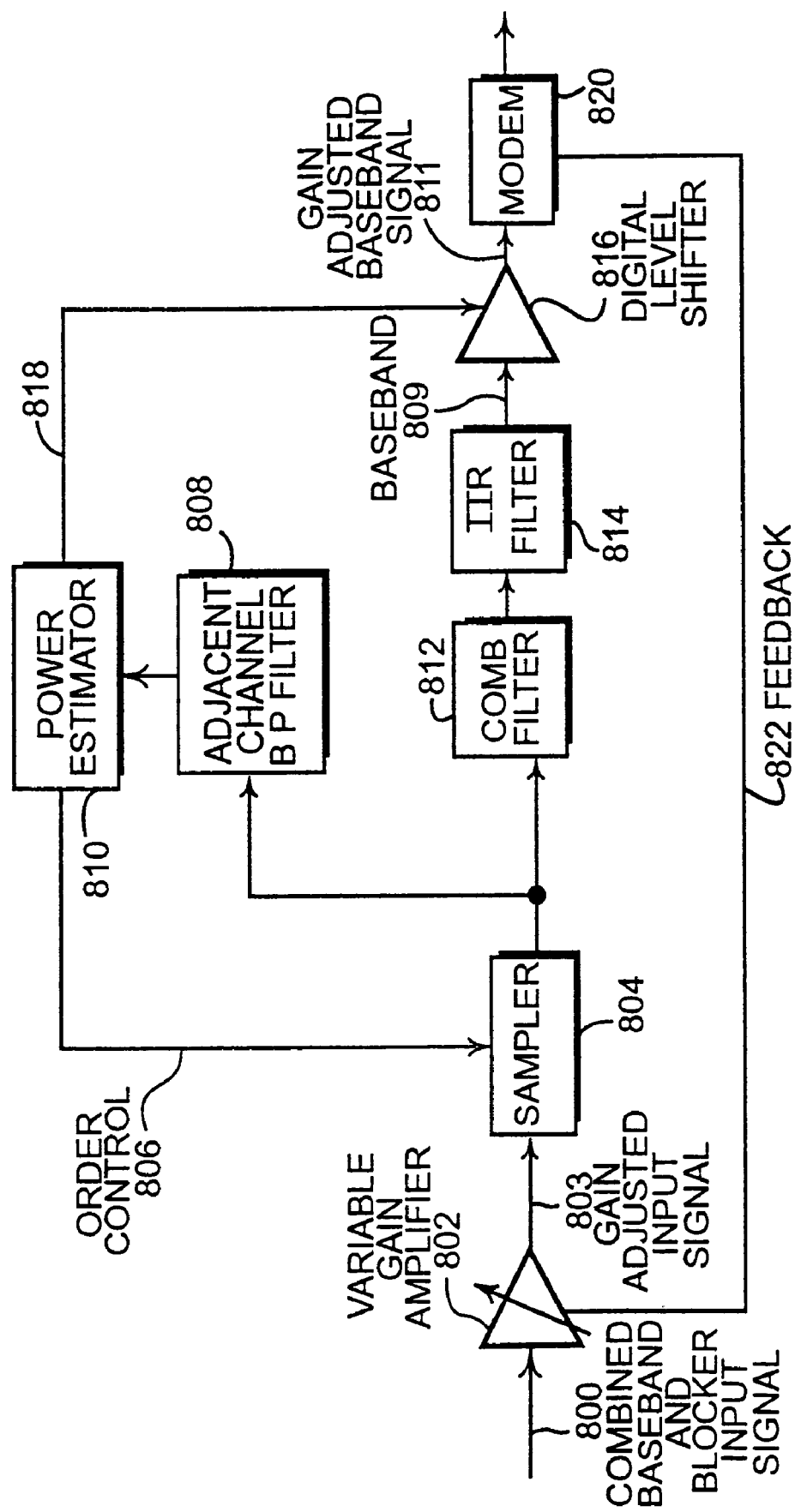
FIG. 8 is a schematic block diagram of another embodiment of the invention that uses a sampler that has a dynamic range that varies by changing the order of operation of the sampler based upon the detected amplitude of the blocker signal.

The embodiment disclosed in FIG. 1A can be utilized in environments where the blocker signal is not so much proportionally larger than the baseband signal that the dynamic range of the over-sampler 112 is insufficient to adequately detect the baseband signal. Other embodiments, such as those disclosed in FIGS. 7 and 8, are capable of adjusting the dynamic range of the over-sampling circuit to insure that the baseband signal is adequately detected.

Figure 1B:
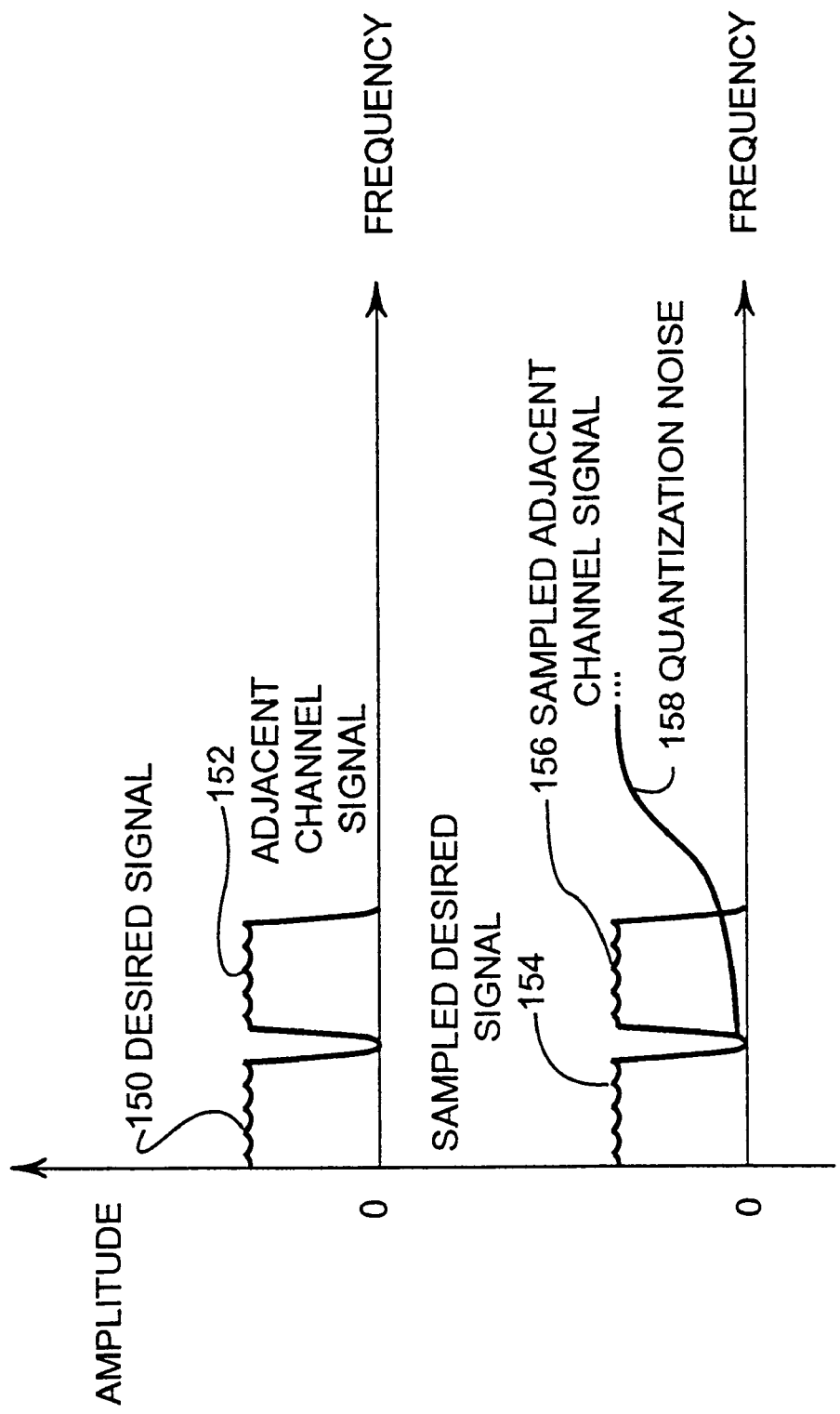
FIG. 1B is a graph illustrating the frequency spectrum of various signals at various locations in the circuit of the present invention.

FIG. 1B is a graph illustrating the frequency response of various signals at various locations in the block diagram of FIG. 1A. As shown in FIG. 1B, the input signal 100 may be comprised of at least a desired signal 150 to be detected and an adjacent channel signal 152 that exists on a channel that is adjacent to the desired signal 150. As also shown in FIG. 1B, the sample input signal (FIG. 1A) may include the sample desired signal 154, the sampled adjacent signal 156 and quantization noise 158 generated by the sampler 112. As is shown in FIG. 1A, the adjacent channel band-pass filter 118 filters the sampled input signal 115 prior to decimation by the decimation filter 111. This is important since the sampled adjacent channel signal 156 of FIG. 1B can be detected without the introduction of aliasing by the decimation filter 111. In other words, the comb filter 114 and the IIR filter 116 introduce alias signals in the process of eliminating the quantization noise created by the sampler 112. These alias signals may appear in the frequency range of the adjacent channel signal. Hence, by filtering the adjacent channel signal from the sampled input signal 115, a true indication of the amplitude level of the sampled adjacent channel signal 156 can be obtained.

Figure 2:
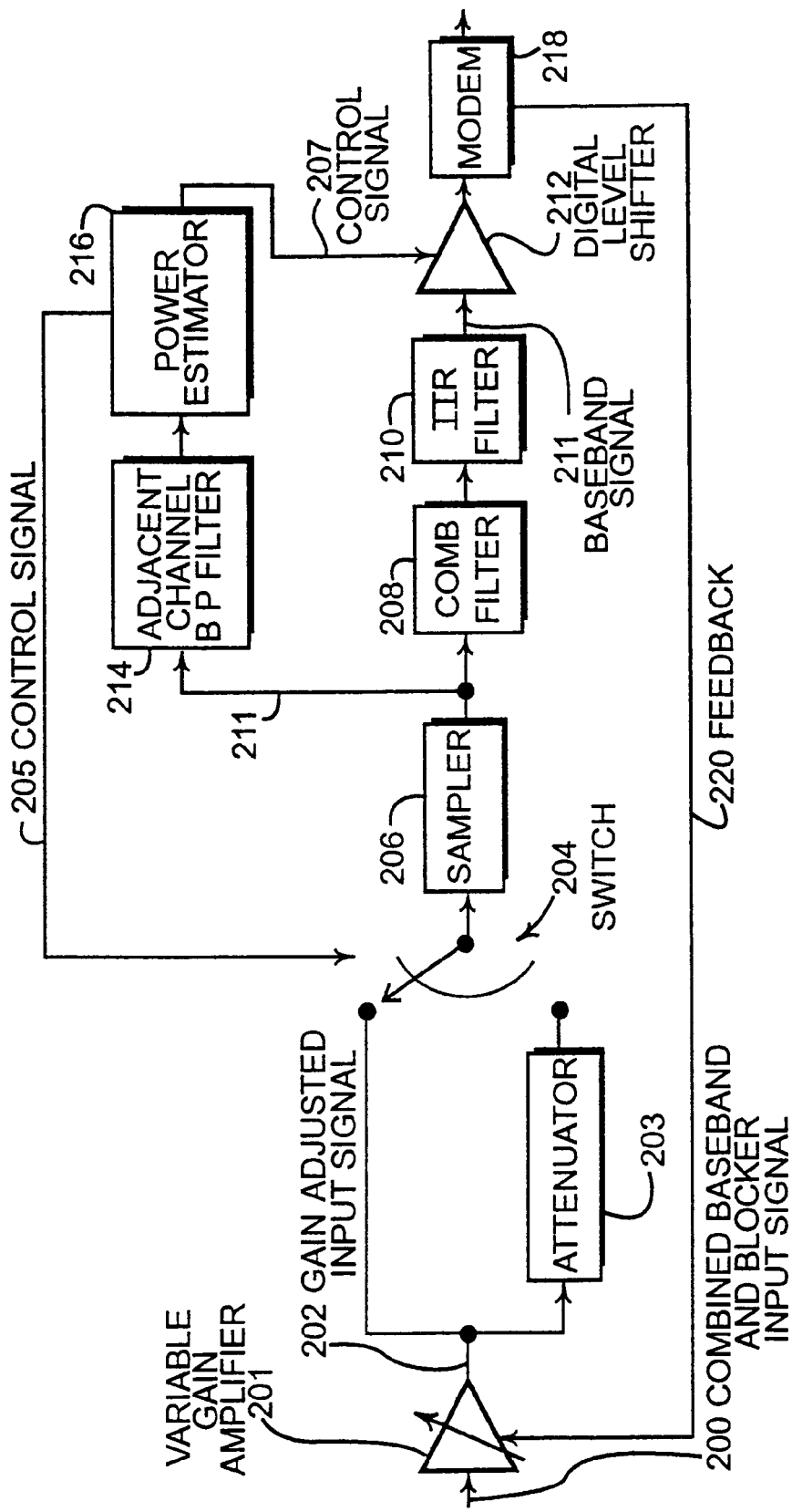
FIG. 2 is a schematic block diagram of another embodiment of the invention that prevents saturation of the sampler circuit using an attenuator.

FIG. 2 discloses another embodiment of the present invention that utilizes an attenuator 203. As shown in FIG. 2, the combined baseband and blocker input signal 200 is applied to a variable gain amplifier 201. The variable gain amplifier has a gain that is controlled by the feedback control signal 220 from modem 218 in the manner described below. The gain-adjusted input signal 202 generated by the variable gain amplifier 201 is applied to an attenuator 203 and a switch 204. Switch 204 operates under the control of a control signal 205 generated by the power (or amplitude) estimator 216. The control signal 205 causes the switch 204 to switch to the attenuator 203 such that the gain-adjusted signal 202 passes through the attenuator 203 prior to being applied to the over-sampling circuit 206 whenever a blocker signal is detected. Sampler 206 functions in the same manner as sampler 112 of FIG. 1 and includes an antialiasing filter, as is the case for all of the remaining embodiments illustrated herein. The output of the sampler is applied to a comb filter 208 and an IIR filter 210 that filter out the blocker signal component and apply the baseband signal component to the digital level shifter 212, in the same manner as disclosed in FIG. 1. The combined sampled signal 211 is applied to the adjacent channel band-pass filter 214 prior to the application to the decimation filters 208, 210 that selects the blocker signal portion of the combined signal 211. The output of the adjacent channel band-pass filter is applied to the power estimator 216 that generates an output control signal 205 whenever the blocker signal is greater than a predetermined threshold. Additionally, power estimator 216 may generate another control signal 207 that is proportional to the amplitude of the blocker signal. The control signal 205 is used to adjust the gain of the digital level shifter 212. In the same manner as disclosed above with regard to FIG. 1, the baseband signal 215 that is applied to the digital level shifter 212 is adjusted in amplitude to account for the attenuation provided by the attenuator 203, as shown in FIG. 2. In this fashion, the feedback signal 220 from the modem 218 provides the proper gain control for the variable gain amplifier and is not affected by the attenuation generated by the attenuator 203. Alternatively, control signal 207 or control signal 205 may be used to simply turn the digital level shifter on or off to provide a predetermined amount of level shifting based upon whether a blocker signal is present or not.

The purpose of the attenuator 203, that is utilized in accordance with the embodiment of FIG. 2, is to ensure that the gain-adjusted signal 202, that is a combination of the baseband signal component and blocker signal component, does not saturate the sampler 206. It is assumed that the variable gain amplifier 201 has a sufficient range of operation so that the combined baseband and blocker signal 200 does not saturate the variable gain amplifier 201. However, it is further assumed that since a blocker signal component exists in the gain-adjusted input signal 202, that the combination of the baseband signal component and blocker signal component must be attenuated so that the sampler 206 is not saturated. In essence, the digital level shifter 212 functions to make up for the attenuation from the attenuator 203. The input to the modem 218 should therefore closely correspond to the amplitude of the gain-adjusted input signal 202.

The embodiment of FIG. 2 can also be used in implementations whenever the proportional amplitude of the blocker signal component to the amplitude of the baseband signal component is not so large as to prevent the dynamic range of the sampler 206 from adequately detecting the baseband signal.

Figure 3:
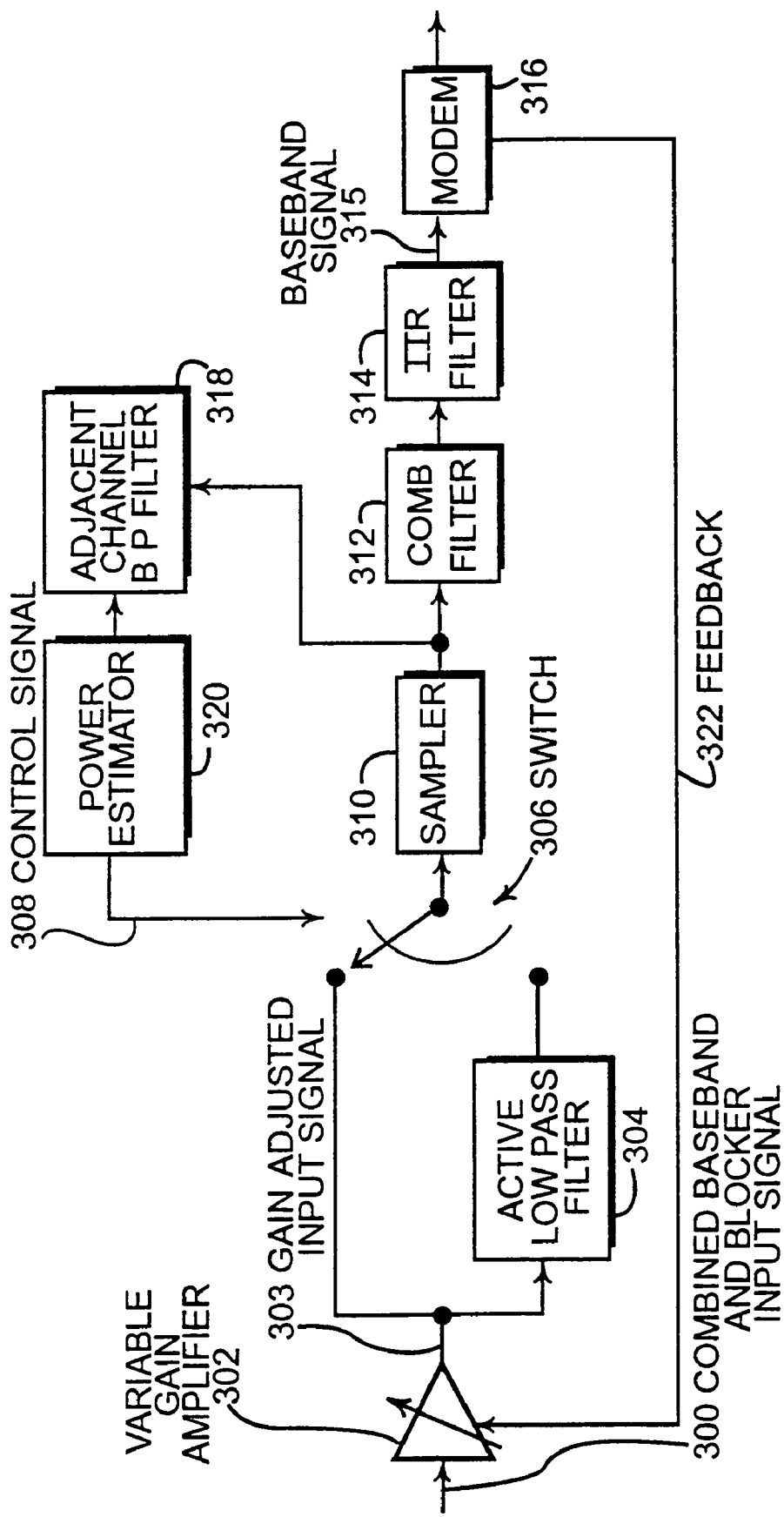
FIG. 3 is a schematic block diagram of another embodiment of the invention that uses an active low-pass filter that is activated only when a blocker signal is present.

FIG. 3 is a schematic illustration of an alternative embodiment of the present invention that utilizes an active low-pass filter 304 that can be integrated on-chip. As shown in FIG. 3, a combined baseband and blocker input signal 300 is applied to the input of a variable gain amplifier 302. Variable gain amplifier 302 has a gain that is controlled by the feedback control signal 322 from modem 316. A switch 306 operates under the control of a control signal 308. When a blocker signal is detected, control signal 308 causes the switch to route the gain-adjusted input signal 303 through the active low-pass filter 304 prior to application to sampler 310. When a blocker signal is not present, the gain-adjusted input signal 303 is applied directly to the sampler 310. Adjacent channel band-pass filter 308 filters the blocker signal component and applies the blocker signal component to the power estimator 320. The power estimator 320, in turn, generates the control signal 308 indicating that a blocker signal is present in the combined baseband and blocker input signal 300. The comb filter 312 and IIR filter 314 filter out the blocker signal and generate the baseband signal 315 that is applied to the modem 316.

In operation, the combined baseband and blocker input signal 300 may comprise just the baseband signal component, or signal 300 may include both the baseband signal component and a blocker signal component. As long as the input signal 300 does not include a blocker signal component, the switch 306 causes the gain-adjusted signal 303 to be routed directly to the sampler 310. In other words, the gain-adjusted signal 303 comprises just the baseband signal component which is passed through the comb filter and the IIR filter and applied to the modem 316. The modem 316 adjusts the gain of the variable gain amplifier to keep the baseband signal 315 in the desired amplitude range. However, when a blocker signal component is present in the input signal 300, the adjacent channel band-pass filter 318 and the power (amplitude) estimator 320 generate a control signal 308 to cause the switch to pass the gain-adjusted input signal 303 through the active low-pass filter 304. The active low-pass filter 304 is designed to primarily pass the baseband signal component to the sampler 310. The active low-pass filter 304, in this fashion, is only activated when a blocker signal is present. Hence, the power consumption levels required to run the active low-pass filter 304 are avoided when the blocker signal is not present. In this fashion, the power consumption of the circuit can be optimized so that the active low-pass filter 304 is only activated when the blocker signal component is detected.

The active low-pass filter 304 illustrated in FIG. 3 can comprise an $n^{th}$ order active operational amplifier filter. The number of stages (and hence order) selected for use in the active low-pass filter 304 can vary with the amount of filtering desired. Of course, the use of additional stages of the active low-pass filter results in greater power consumption. Hence, the level of filtering can be balanced with the desired amount of rejection of the blocker signal component that is applied to the sampler 310. For example, the circuit designer can balance the requirements of power consumption versus signal detection capability to provide a design that produces the desired results. In applications where blocker signals are prevalent, the designer may wish to provide an active low-pass filter 304 that has numerous stages and provides high rejection of blocker signals. In this fashion, the sampler 310 can use a larger portion of its dynamic range to detect the baseband signal, rather than detecting the blocker signal.

Alternatively, the active low-pass filter 304 illustrated in FIG. 3 can be directly controlled by control signal 308 to activate different stages of the active low-pass filter 304 depending upon the amplitude of the blocker signal component that is detected by the adjacent low-pass filter 318 and the power estimator 320. In other words, control signal 308 can comprise a variable level signal that is used to sequentially activate or deactivate stages of the active low-pass filter 304 to provide the appropriate level of filtering based upon the detected amplitude of the blocker signal component. In this fashion, the power consumption level of the active low-pass filter 304 can be adjusted in accordance with the amplitude of the blocker signal component that exists in the combined baseband and blocker signal input 300.

Figure 4:
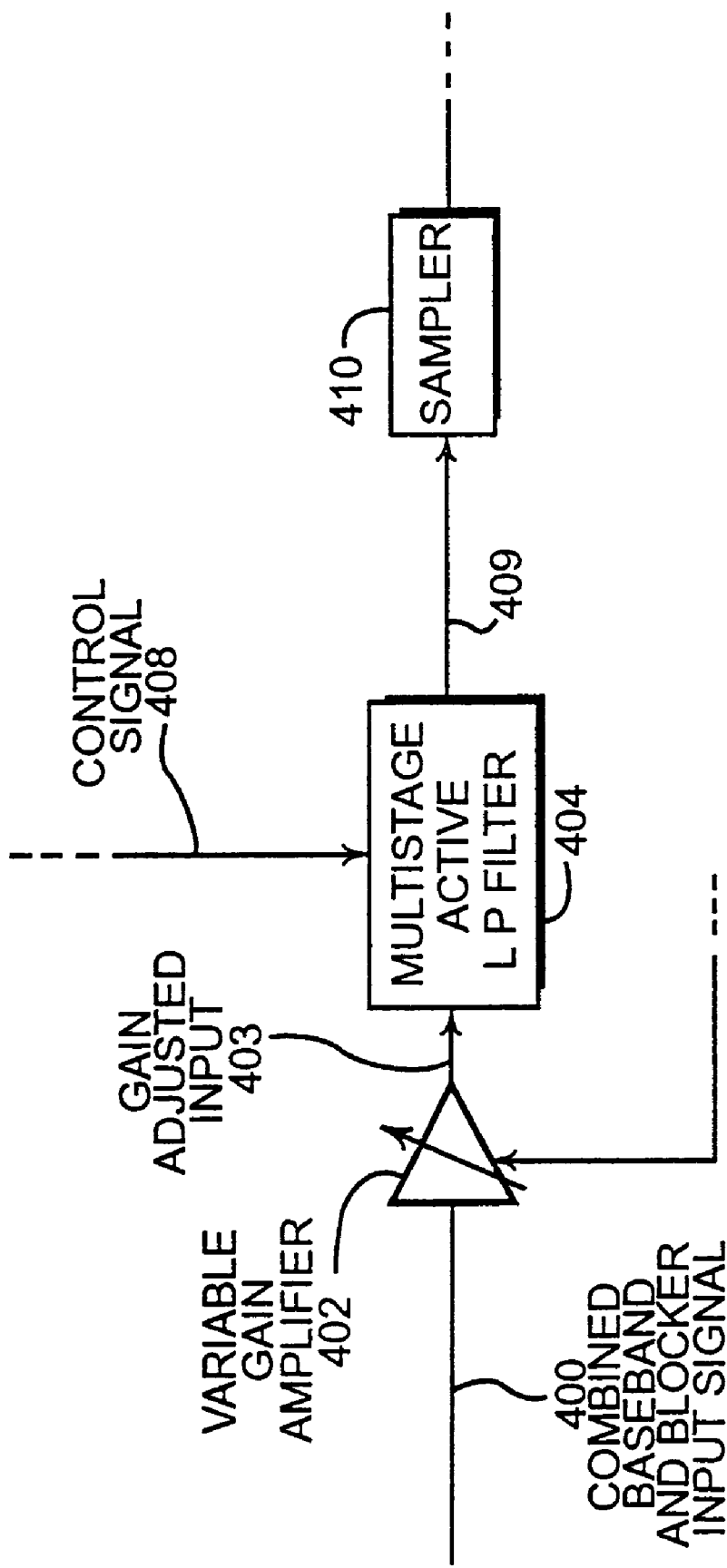
FIG. 4 is a schematic block diagram of a portion of the A/D circuit that utilizes a multistage active low-pass filter that varies the amount of filtering in accordance with the amplitude of the blocker signal that is detected.

FIG. 4 illustrates another embodiment of the invention that uses a multistage active filter 404 such as described above. As shown in FIG. 4, a combined baseband and blocker input signal 400 is applied to a variable gain amplifier 402. The gain-adjusted input signal 403 is applied to a multistage active low-pass filter 404. A control signal 408 that is generated by a power (amplitude) estimator, such as power estimator 320 illustrated in FIG. 3, is a variable level signal that is indicative of the amplitude of the blocker signal component in the combined baseband and blocker input signal 400. The multistage active low-pass filter 404 receives the control signal 408 and activates additional stages of the active low-pass filter as the level of the control signal 408 increases. Conversely, stages of the multistage active low-pass filter 404 are deactivated as the level of the control signal 408 decreases. In this fashion, the amount of the blocker signal component that is present in the input to the sampler 410 can be minimized to an acceptable level so that the sampler 410 provides sufficient dynamic range to ensure that the baseband signal is adequately detected in the presence of a blocker signal. At the same time, the multistage active low-pass filter 404 only consumes enough power to provide the required amount of filtering to maintain a sufficient ratio of the baseband signal component to blocker signal component. The multistage active low-pass filter 404 can have zero to n stages of filtering. In other words, the multistage active low-pass filter 404 can simply pass the gain-adjusted input signal without activating any stages of filtering when a blocker signal component is not present. Additionally, the designer of the circuit can provide as many stages as are deemed necessary to provide the quality of signal needed when strong blocker signal components are present.

Figure 5:
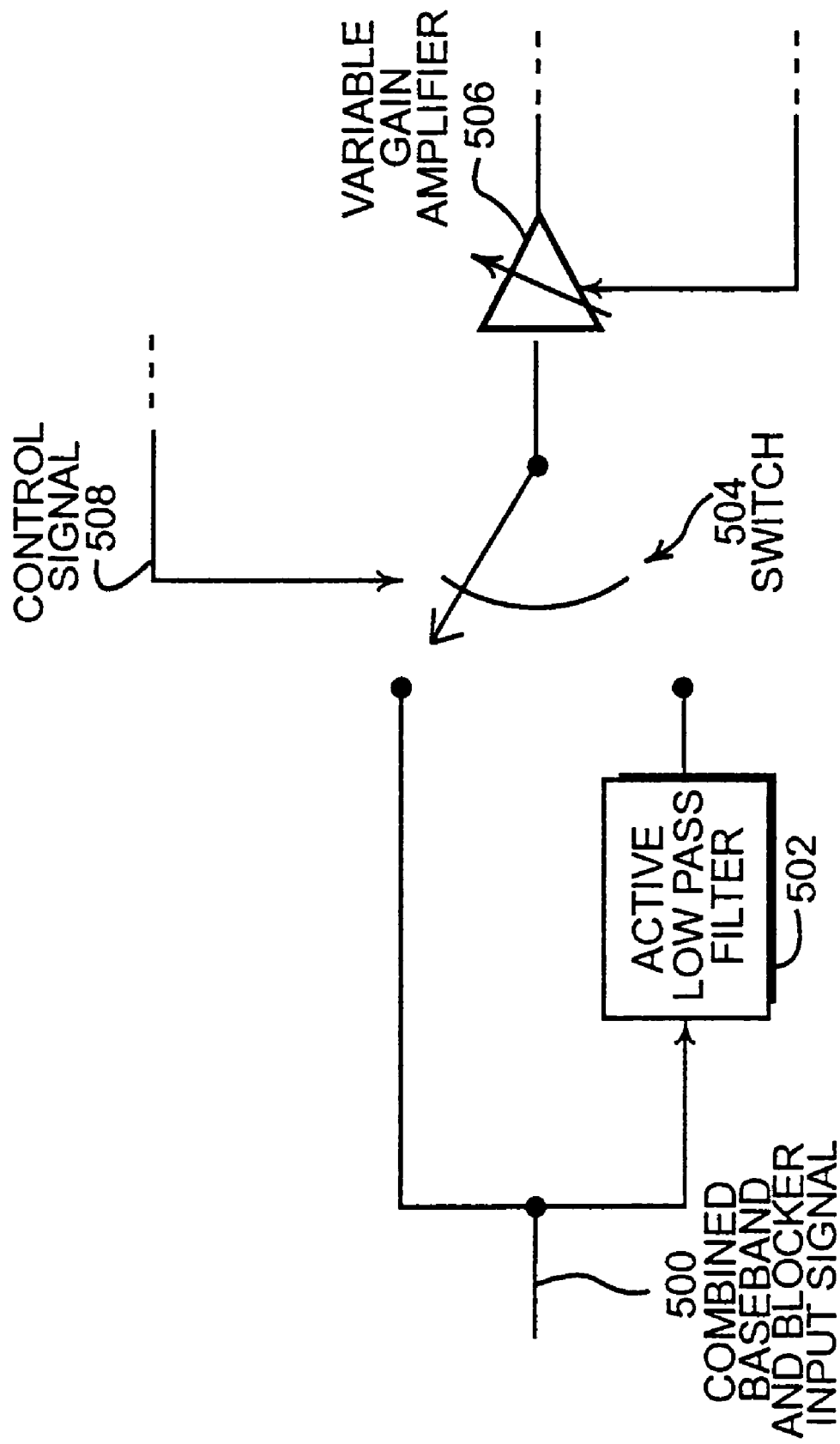
FIG. 5 is a schematic block diagram that illustrates the use of an active low-pass filter upstream from the variable gain amplifier.

FIG. 5 is a schematic block diagram of a variation of the device illustrated in FIG. 3 that employs the active low-pass filter 502 upstream from the variable gain amplifier 506. As shown in FIG. 5, switch 504 operates under the control of a control signal 508. Control signal 508 corresponds to control signal 308 that is generated by power estimator 320. When no blocker signal component is present in the combined baseband and blocker input signal 500, switch 504 routes the signal 500 directly to the variable gain amplifier 506 which corresponds to the variable gain amplifier 302 of FIG. 3. If a blocker signal component is detected, as indicated by control signal 508, switch 504 routes the combined signal 500 through the active low-pass filter 502 to the input of the variable gain amplifier 506. In other words, the device illustrated in FIG. 5 essentially has moved the active low-pass filter 304 and switch 306, illustrated in FIG. 3, to the input side of the variable gain amplifier 302. In this fashion, the variable gain amplifier 506 will not be saturated by large amplitudes of the blocker signal component that are part of the combined baseband and blocker input signal 500.

Figure 6:
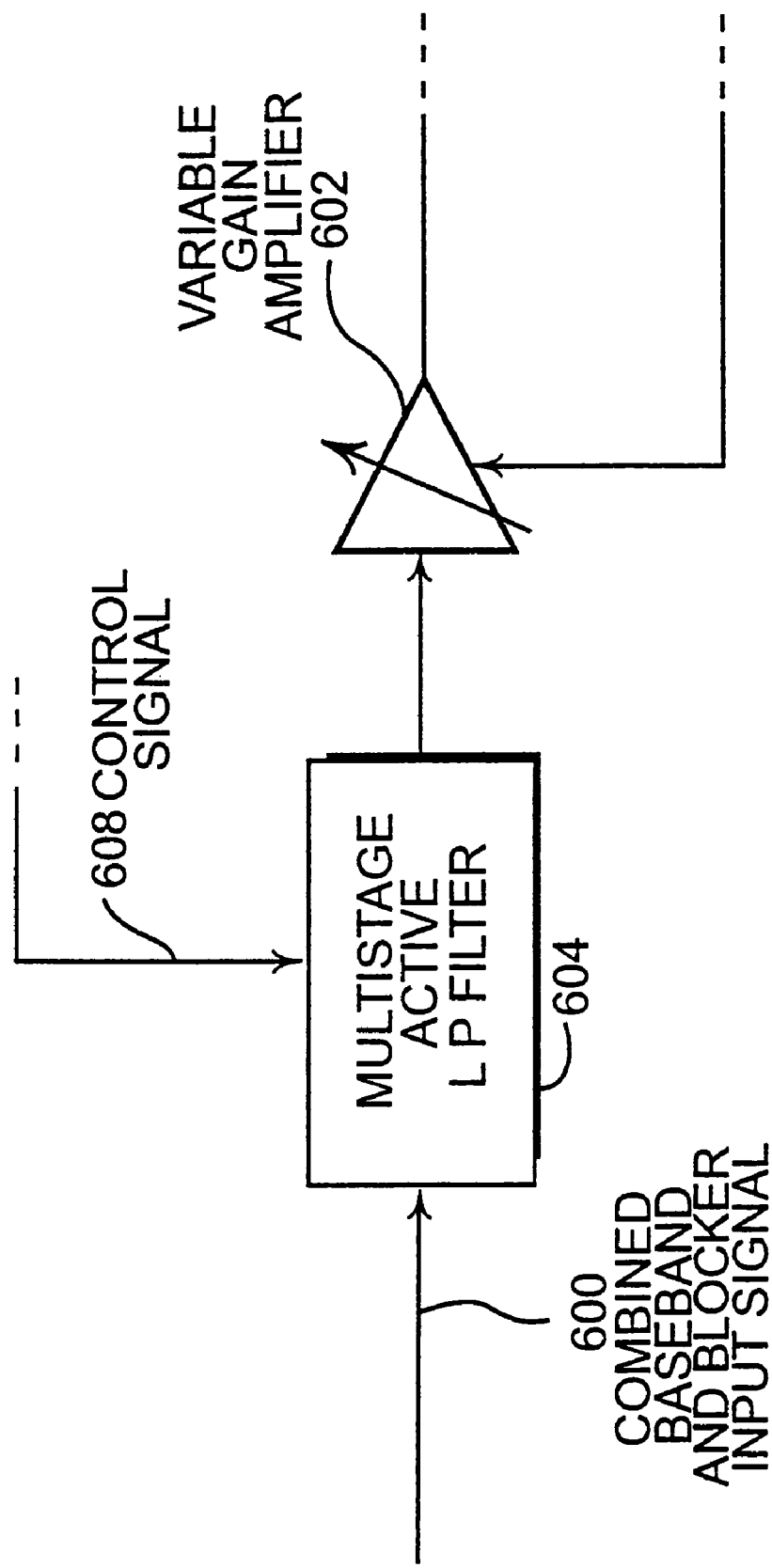
FIG. 6 is a schematic block diagram that illustrates the use of a multistage active low-pass filter upstream from the variable gain amplifier.

FIG. 6 is a variation of the embodiment illustrated in FIG. 4. As shown in FIG. 6, the multistage active low-pass filter 604 has been moved to the input side of the variable gain amplifier 602. The multistage active low-pass filter 604 operates in the same fashion as the multistage active low-pass filter 404 described with respect to FIG. 4. Control signal 608 is a variable level signal indicating the amplitude of blocker signal that is detected by an adjacent channel band-pass filter, such as adjacent band-pass filter 318, and a power estimator such as power estimator 320 illustrated in FIG. 3. Control signal 608 functions to selectively activate and deactivate multiple stages of the multi-stage active low-pass filter 604 to filter the combined baseband and blocker input signal 600. Again, an advantage of this configuration is that the variable gain amplifier 602 and other downstream components are not subjected to large signal levels of blocker signal component that may cause the variable gain amplifier 602 to become saturated.

FIG. 7 discloses another embodiment of the present invention. The device illustrated in FIG. 7 increases the dynamic range of the sampler 704 when a blocker signal component is present by increasing the sampling rate of the sampler 704. As shown in FIG. 7, the combined baseband and blocker input signal 700 is applied to the variable gain amplifier 702. Again, the combined input signal 700 may include one or more blocker signal components or may only include the baseband signal component depending on the timing and conditions of the receipt of the signal 700. The variable gain amplifier 702 adjusts the gain of the combined input signal 700 in response to a feedback control signal 720 from modem 712 in the manner described above. The gain-adjusted signal 703 is applied to the sampler 704. The sampler 704 over-samples the gain-adjusted input signal 703 and applies the sampled signal to a comb filter 706 and an adjacent channel band-pass filter 714. The adjacent channel band-pass filter 714 is similar to the other adjacent band-pass filters disclosed above. The adjacent channel band-pass filter detects blocker signal components from one or more adjacent channels. The power (amplitude) estimator 716 determines the power or amplitude level of the blocker signal component and generates a clock rate control signal 718 that is applied to the sampler 704. The clock rate control signal 718 is based upon the power level of the blocker signal component that exists in the gain-adjusted input signal 703. The sampler 704 responds to the clock rate control signal 718 by either increasing or decreasing the sampling rate. From a design point of view, it is easiest to increase the sampling rate by an integer multiple such as 2× of the original clock rate. Hence, the clock rate control signal 718 may generate a control signal that causes the sampler 704 to increase the sampling rate of sampler 704 by 2× or some other integer multiple whenever a blocker signal is present.

The effect of increasing the sampling rate of the sampler 704, disclosed in FIG. 7, is to increase the dynamic range of the sampling circuit 704. By increasing the dynamic range of the sampling circuit 704, the baseband component of the combined signal can be detected assuming the sampling rate is sufficient to provide a dynamic range of the sampler 704 that is sufficient to detect the baseboard component of the input signal. Of course, the increased clock rate and the increased sampling rate of the sampler 704 increases the power consumption of the overall circuit. However, since increased sampling only occurs when the blocker signal component is present, power consumption can be minimized.

The clock rate control signal 718 is also applied to the adjacent channel band-pass filter 714, the comb filter 716 and the IIR filter 708. Each of these filters requires a change in the coefficients and/or filter structure when the clock rate is changed. The proper adjustments in coefficients and/or filter structure are made in each of these filters under the control of clock rate input 718.

As indicated above, with respect to FIG. 7, the combined input signal is applied to the comb filter 706 and the IIR filter 708 so that the baseband signal 709 is extracted from the combined input signal. The baseband signal 709 is applied to the digital level shifter 710. Since the variable gain amplifier 702 must be adjusted for the dynamic range for the combined input signal 700, that includes both the baseband component and blocker signal component, the digital level shifter 710 adjusts the level of the baseband signal 709 to be within the desired input range of modem 712. In this fashion, the modem 712 receives the gain level adjusted baseband signal and generates a feedback control signal 720 that is consistent with the proper adjustment of the variable gain amplifier 702 for the combined input signal 700.

The advantages of the embodiment illustrated in FIG. 7 are that the sampler 704 is only adjusted to increase sampling rates when a blocker signal component is present. Hence, power consumption is minimized. Further, proper detection of the baseband signals is ensured since the dynamic range of the sampler is adjusted whenever a blocker signal is present. Of course, the sampler circuit 704 can be adjusted to different sampling rates based upon the amplitude of the blocker signal. For example, the sampling circuit 704 may be adjusted by even multiples such as 2×, 4×, 6× . . . based upon the detected amplitude of the blocker signal. Further, sampling circuit 704 can be designed to continuously adjust the sampling rate based upon the amplitude of the blocker signal component. In this fashion, a continuous change in the sampling rate can be provided so that a sufficient selected amount of dynamic range can be provided to ensure that the baseband signal component is detected for various amplitudes of blocker signal component. This embodiment clearly minimizes the power consumption that is required to ensure that the baseband signal is properly detected.

FIG. 8 is a schematic block diagram that is similar to the embodiment of FIG. 7, but changes the order of operation of the sampling circuit 804 based upon the amplitude of the blocker signal component in the combined baseband and blocker input signal 800. As shown in FIG. 8, the combined baseband and blocker input signal 800, which may or may not include a blocker signal component, is applied to the variable gain amplifier 802. The variable gain amplifier has an adjustable gain that operates under the control of the feedback control signal 822 from the modem 820. The variable gain amplifier 802 generates a gain-adjusted signal 803 that has an amplitude that does not cause the sampler 804 to saturate. The gain-adjusted signal 803 is applied to the input of the sampler 804. The sampler 804 samples the gain-adjusted signal 803 in accordance with a particular order that is controlled by the order control signal 806.

The sampler 804, illustrated in FIG. 8, utilizes a series of integrator circuits that determine the order of operation of the sampler 804. In other words, the sampler 804 may be an Nth order sampler. The higher the order of the sampler 804, the larger dynamic range the sampler has to sample signals. Sampler 804 is a variable order sampler so that the order control signal 806 can vary the order of the sampler 804 to adjust the dynamic range of the sampler 804. Of course, as higher orders are selected, the power consumption of the sampler circuit 804 increases. By using lower order sampling, when either no or very small blocker signal component amplitudes are present, power can be conserved.

The remaining portion of the block diagram illustrated in FIG. 8 operates in the same manner as the block diagram illustrated in FIG. 7. The output of the sampler 804 is applied to the comb filter 812 and the adjacent channel band-pass filter 808. The adjacent channel band-pass filter 808 detects the presence of an adjacent channel blocker signal component. The power estimator 810 determines the amplitude of the blocker signal component in the combined signal 800. The power (amplitude) estimator generates the order control signal 806 to select the order that the sampler 804 should use to sample the gain-adjusted input signal 803. In addition, the power estimator generates a gain control signal 818 that is applied to the signal level shifter 816 to adjust the signal level of the baseband signal 809 as it is applied to the input of the signal level shifter 816. In this fashion, the modem 820 receives the gain-adjusted baseband signal 811 and generates a feedback control signal 822 that adjusts the input signal 803 so that baseband signal 811 is in the desired range. In this fashion, the gain-adjusted signal 803 has the proper amplitude when applied to the sampler circuit 804.

The present invention therefore provides several unique ways to process a combined input signal that may include both a baseband signal component and blocker signal component. The system is capable of detecting the presence of a blocker signal component in the combined signal and adjusts the gain of the system to ensure that saturation does not occur. This can be done by simply adjusting the level of the baseband signal component based on the amplitude of the blocker signal component to ensure that the variable gain amplifier is properly adjusted to generate a gain-adjusted combined input signal that includes both the baseband component and the blocker signal component. Further, the present invention can be implemented to automatically provide attenuation of the combined signal whenever the blocker signal component is detected. The baseband signal component can then be adjusted upwardly so that the modem generates a feedback signal that properly adjusts the variable gain amplifier for the combined input signal that includes both the baseband component and the blocker signal component. The present invention can also activate active low-pass filters whenever a blocker signal component is present in the combined input signal. Multistage active low-pass filters can be used that activate an increasing number of stages as the amplitude of the blocker signal component increases. These types of active low-pass filters can be employed either before or after the variable gain amplifier. The advantage of such a system is that the sampling circuit can use a fixed dynamic range that will ensure that the baseband signal is adequately detected. Power consumption is also minimized because the active low-pass filter, or the additional stages of the active low-pass filter, are only employed when the baseband signal is present. The multistage active low-pass filters are capable of maintaining a sufficient signal level to allow the baseband signal to be adequately sampled in accordance with the fixed dynamic range of the sampler. The present invention also utilizes techniques for adjusting the dynamic range of the sampling circuit based upon the amplitude level of the blocker signal component that exists in the combined signal. This is accomplished by changing the clock rate of the sampler or changing the order of operation of the sampler to achieve a higher or lower dynamic range.

All of these different techniques are capable of using on-chip components that provide for a high degree of integration and eliminate the need for separate discrete components and the attendant structure associated with separate discrete components such as additional room on the circuit board, pin-outs required for the discrete components, etc. Although the various systems of the present invention may require some additional power consumption, that power consumption is minimized by only activating circuits when a blocker signal component is present, and in some cases only activating those circuits to the degree necessary to overcome the effect of the blocker signal component.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of preventing saturation of an analog to digital converter circuit by an input signal that contains both a baseband signal component and a blocker signal component comprising:

oversampling said input signal;

separating said blocker signal component from said input signal;

detecting amplitude of said blocker signal component;

separating said baseband signal component from said input signal;

adjusting amplitude of said baseband signal component based upon said amplitude of said blocker signal component prior to application of said baseband signal component to a modem that controls gain of a wireless receiver circuit so that said gain maintains said input signal in a range that prevents saturation of said wireless receiver circuit.

2. The method of claim 1 further comprising:

attenuating said input signal prior to application to an A/D circuit in said wireless receiver circuit whenever said blocker signal component is detected in said input signal to ensure that said A/D circuit is not saturated.

3. A method of actively filtering an input signal of an analog to digital converter circuit that may contain both a baseband signal component and a blocker signal component comprising:

detecting said blocker signal component in said input signal;

generating a control signal upon detection of said blocker signal component;

applying an active filter to said input signal in response to said control signal whenever said blocker signal component is detected in said input signal so that power consumption of a receiver circuit is minimized, said active filter being integrated into said receiver circuit.

4. The method of claim 3 wherein said method of applying an active filter to said input signal comprises:

applying a multistage active filter to said input signal in response to said control signal such that a selected number of a plurality of filtering stages of said multistage active filter are used to filter said input signal based upon a detected amplitude of said control signal.

5. The method of claim 3 wherein said method of applying said active filter to said input signal comprises applying said active filter to said input signal upstream from a variable gain amplifier in said receiver circuit.

6. The method of claim 3 wherein said method of applying an active filter to said input signal comprises applying said active filter to said input signal downstream from a variable gain amplifier in said receiver circuit.

7. A method of adjusting dynamic range of a sampling circuit having a sampling rate in a wireless receiver circuit to increase detection of a baseband signal component in an input signal that contains a baseband signal component and a blocker signal component comprising:

separating said blocker signal component from said input signal;

detecting said blocker signal component in said input signal;

adjusting said sampling rate of said sampling circuit based upon said blocker signal component in said input signal such that said dynamic range of said sampling circuit increases whenever said blocker signal component is present.

8. The method of claim 7 wherein said method of detecting said blocker signal component further comprises:

detecting amplitude of said blocker signal component.

9. The method of claim 8 further comprising:

separating said baseband signal component from said input signal;

adjusting amplitude of said baseband signal component based upon said amplitude of said blocker signal component prior to application of said baseband signal component to a modem that controls gain of said wireless receiver circuit so that said gain maintains said input signal in a range that prevents saturation of said wireless receiver circuit.

10. The method of claim 8 wherein said method of adjusting said sampling rate of said sampling circuit further comprises:

adjusting said sampling rate of said sampling circuit in accordance with said amplitude of said blocker signal.

11. A method of adjusting the dynamic range of a sampling circuit in a wireless receiver circuit to increase detection of a baseband signal in an input signal that may contain a baseband signal and blocker signal comprising:

separating said blocker signal component from said input signal;

detecting said blocker signal component in said input signal;

adjusting an order of operation of said sampling circuit based upon the presence of said blocker signal component in said input signal such that said dynamic range of said sampling circuit increases whenever said blocker signal is present.

12. The method of claim 11 wherein said method of detecting the presence of said blocker signal component further comprises:

detecting amplitude of said blocker signal component.

13. The method of claim 11 further comprising:

separating said baseband signal component from said input signal;

adjusting amplitude of said baseband signal component based upon said amplitude of said blocker signal component prior to application of said baseband signal to a modem that controls the gain of said wireless receiver circuit so that said gain maintains said input signal in a range that prevents saturation of said wireless receiver circuit.

14. The method of claim 11 wherein said method of adjusting said order of operation of said sampling circuit further comprises:

adjusting said order of operation of said sampling circuit in accordance with said amplitude of said blocker signal.

15. A wireless receiver circuit that automatically adjusts gain of an input signal that contains both a baseband signal component and a blocker signal component to prevent saturation of receiver circuit comprising:

a modem having a modem input that receives said baseband signal component and generates a gain control signal that varies in accordance with amplitude of said baseband signal;

a variable gain control amplifier that controls said gain of said input signal in accordance with amplitude of said gain control signal;

a blocker signal detector that determines amplitude of said blocker signal component of said input signal and generates a digital level shifter control signal;

a digital level shifter that shifts said amplitude of said baseband signal in accordance with said digital level shifter control signal so that said amplitude of said baseband signal that is applied to said modem is within a predetermined input range of said modem.

16. The wireless receiver circuit of claim 15 further comprising:

an attenuator that is connected to an output of said variable gain amplifier whenever said blocker signal detector determines that said amplitude of said blocker signal component exceeds a predetermined threshold.

17. In an analog to digital converter circuit, a method of ensuring detection of a baseband signal in an input signal that contains both a baseband signal component and a blocker signal component comprising:

oversampling said input signal;

separating said blocker signal component from said input signal;

detecting amplitude of said blocker signal component;

separating said baseband signal component from said input signal;

adjusting amplitude of said baseband signal component to ensure proper detection of said baseband signal component while maintaining gain of said input signal in a range that prevents saturation of a wireless receiver circuit.

* * * * *